United States Patent
Khan et al.

(10) Patent No.: US 10,784,935 B2
(45) Date of Patent: Sep. 22, 2020

(54) SYSTEMS AND METHODS FOR BANDWIDTH EXPANSION AND FREQUENCY SCALING

(71) Applicant: Phazr, Inc., Allen, TX (US)

(72) Inventors: Farooq Khan, Allen, TX (US); Robert Clark Daniels, Austin, TX (US); Khurram Muhammad, Fort Worth, TX (US); Eran Pisek, Allen, TX (US); Paul Gilliland, Allen, TX (US); Khalil Haddad, Allen, TX (US)

(73) Assignee: Phazr, Inc., Allen, TX (US)

( * ) Notice: Subject to any disclaimer, the term of this patent is extended or adjusted under 35 U.S.C. 154(b) by 0 days.

(21) Appl. No.: 15/642,308

(22) Filed: Jul. 5, 2017

(65) Prior Publication Data

US 2018/0026689 A1 Jan. 25, 2018

Related U.S. Application Data

(60) Provisional application No. 62/364,312, filed on Jul. 19, 2016.

(51) Int. Cl.
*H04B 7/06* (2006.01)
*H04B 7/0413* (2017.01)
*H04B 7/08* (2006.01)
*H04B 15/02* (2006.01)
*H04B 7/10* (2017.01)

(52) U.S. Cl.
CPC .............. *H04B 7/06* (2013.01); *H04B 7/0413* (2013.01); *H04B 7/08* (2013.01); *H04B 7/10* (2013.01); *H04B 15/02* (2013.01)

(58) Field of Classification Search
CPC .. H04B 7/0413; H04B 7/0452; H04B 7/0634; H04B 17/336; H04B 7/061; H04B 15/02; H04B 17/327; H04B 1/40; H04B 7/0691; H04B 7/0891
USPC .......................................... 375/144; 398/116
See application file for complete search history.

(56) References Cited

U.S. PATENT DOCUMENTS

| | | | |
|---|---|---|---|
| 2010/0103906 A1* | 4/2010 | Montojo | H04J 11/0069 370/335 |
| 2011/0051612 A1* | 3/2011 | Van Driest | H04B 1/7075 370/252 |
| 2013/0070876 A1* | 3/2013 | Wu | H03D 7/14 375/340 |
| 2013/0286960 A1* | 10/2013 | Li | H04W 72/042 370/329 |
| 2015/0372740 A1* | 12/2015 | Ko | H04W 72/0413 370/329 |
| 2017/0201288 A1* | 7/2017 | Magers | H04B 1/403 |

* cited by examiner

Primary Examiner — David C Payne
Assistant Examiner — Sarah Hassan
(74) Attorney, Agent, or Firm — Michael A. Rahman

(57) ABSTRACT

A wireless transmitter includes a signal processing circuit configured to generate a plurality of first and second spatial streams signals. The transmitter includes a frequency shift circuit configured to selectively apply different frequency shifts to the first and second spatial streams signals. A wireless receiver includes a frequency shift circuit configured to selectively apply different frequency shifts to the received first and second spatial streams signals. The receiver also includes a signal processing circuit configured to process the first and second frequency shifted signals.

32 Claims, 9 Drawing Sheets

SYSTEMS AND METHODS FOR BANDWIDTH EXPANSION AND FREQUENCY SCALING

CROSS-REFERENCE TO RELATED APPLICATION

This application claims priority to U.S. Provisional Patent Application No. 62/364,312, filed Jul. 19, 2016 and entitled "A SYSTEM AND METHOD FOR BANDWIDTH EXPANSION AND FREQUENCY SCALING" which is hereby incorporated by reference in its entirety.

BACKGROUND

The invention relates to wireless communications, and in particular relates to systems and methods for bandwidth expansion and frequency scaling.

Description of the Related Art

Currently, wireless access methods are based on two popular standards: a wide area network (WAN) standard referred to as The Fourth Generation Long Term Evolution (4G LTE) system; and a local area network (LAN) standard called Wi-Fi. Wi-Fi is generally used indoors as a short-range wireless extension of wired broadband systems. The 4G LTE systems on the other hand provide wide area long-range connectivity both outdoors and indoors using dedicated infrastructure such as cell towers and backhaul to connect to the Internet.

As more people connect to the Internet, increasingly chat with friends and family, watch videos, listen to streamed music, and indulge in virtual or augmented reality, data traffic continues to grow at unprecedented rates. In order to address the continuously growing wireless capacity challenge, the next generation of LAN and WAN systems are expected to rely on higher frequencies referred to as millimeter waves in addition to currently used frequency bands below 6 GHz.

BRIEF SUMMARY OF THE INVENTION

According to disclosed embodiments, a wireless transmitter includes a signal processing circuit configured to generate a plurality of first and second spatial streams signals. The transmitter includes a frequency shift circuit configured to selectively apply different frequency shifts to the first and second spatial streams signals. The transmitter also includes a mixer configured to up-convert the frequency shifted first and second spatial streams signals to first and second millimeter wave frequency band signals. The transmitter also includes a horizontally polarized multiple input multiple output (MIMO) antenna array configured to transmit the first millimeter wave frequency band signals and a vertically polarized multiple input multiple output (MIMO) antenna array configured to transmit the second millimeter wave frequency band signals.

The wireless transmitter also includes a plurality of power amplifiers configured to amplify the first and second millimeter wave frequency band signals prior to transmission by the horizontally and vertically polarized MIMO antenna array. The transmitter also includes a plurality of phase shifters configured to apply phase shifts to the up-converted millimeter wave frequency band signals. The millimeter wave frequency bands are greater than 20 GHz. The first and second spatial streams signals are sub-6 GHz signals. The wireless transmitter also includes a signal combiner configured to combine the frequency shifted signals prior to up-conversion.

According to disclosed embodiments, a wireless transmitter includes a mixer driven by a local oscillator configured to selectively apply different frequency shifts to the first and second spatial streams and to up-convert the frequency shifted first and second spatial streams signals to first and second millimeter wave frequency band signals.

According to disclosed embodiments, a wireless transmitter includes a signal processing circuit configured to generate a plurality of spatial streams signals. The wireless transmitter includes a frequency shift circuit configured to selectively apply different frequency shifts to the spatial streams signals and a mixer configured to up-convert the frequency shifted spatial streams signals to millimeter wave frequency band signals. The transmitter includes a plurality of power amplifiers configured to amplify the millimeter wave frequency band signals and a multiple output (MIMO) antenna array configured to transmit the millimeter wave frequency band signals.

According to disclosed embodiments, a wireless receiver includes a horizontally polarized multiple input multiple output (MIMO) antenna array configured to receive first millimeter wave frequency band signals and a vertically polarized multiple input multiple output (MIMO) antenna array configured to receive the second millimeter wave frequency band signals. The receiver also includes a mixer configured to down-convert the first and second millimeter wave frequency band signals and a frequency shift circuit configured to selectively apply different frequency shifts to the first and second down-converted signals. The receiver also includes a signal processing circuit configured to process the first and second frequency shifted signals.

The receiver also includes a plurality of low noise amplifiers coupled to the MIMO antenna array. The low noise amplifiers are configured to amplify the first and second millimeter wave frequency band signals. The receiver also includes a plurality of phase shifters configured to apply phase shifts to the first and second millimeter wave frequency band signals.

According to disclosed embodiments, the receiver includes a mixer driven by a local oscillator configured to down-convert the first and second millimeter wave frequency band signals and to selectively apply different frequency shifts to the first and second down-converted signals.

DETAILED DESCRIPTION

According to some disclosed embodiments, low-frequency signals (e.g., sub-6 GHz) are expanded over a larger bandwidth, up-converted and transmitted at higher millimeter wave band frequencies. Table 1 provides examples of millimeter wave bands.

TABLE 1

Examples of millimeter wave bands

| Bands [GHz] | Frequency [GHz] | Bandwidth [GHz] |
|---|---|---|
| 24 GHz Bands | 24.25-24.45 | 0.200 |
|  | 25.05-25.25 | 0.200 |
| LMDS Band | 27.5-28.35 | 0.850 |
|  | 29.1-29.25 | 0.150 |
|  | 31-31.3 | 0.300 |
| 39 GHz Band | 38.6-40 | 1.400 |
| 37/42 GHz Bands | 37.0-38.6 | 1.600 |
|  | 42.0-42.5 | 0.500 |
| 60 GHz | 57-64 | 7.000 |
|  | 64-71 | 7.000 |
| 70/80 GHz | 71-76 | 5.000 |
|  | 81-86 | 5.000 |
| 90 GHz | 92-94 | 2.900 |
|  | 94.1-95.0 |  |
| 95 GHz | 95-100 | 5.000 |
| 105 GHz | 102-105 | 7.500 |
|  | 105-109.5 |  |
| 112 GHz | 111.8-114.25 | 2.450 |
| 122 GHz | 122.25-123 | 0.750 |
| 130 GHz | 130-134 | 4.000 |
| 140 GHz | 141-148.5 | 7.500 |
| 150/160 GHz | 151.5-155.5 | 12.50 |
|  | 155.5-158.5 |  |
|  | 158.5-164 |  |

Figure 1:
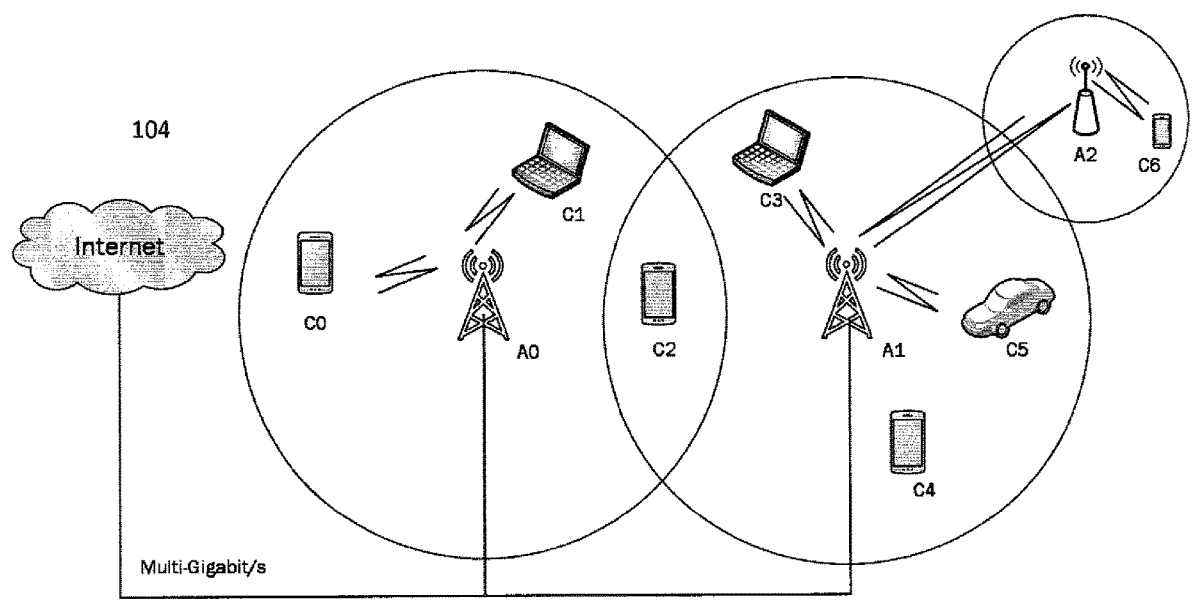
FIG. 1 illustrates a wireless network in accordance with disclosed embodiments.

FIG. 1 illustrates a wireless network 100 in accordance with disclosed embodiments. The wireless network 100 provides service to a plurality of communications devices in a coverage area using higher millimeter wave signals. The network 100 includes access points A0 and A1 connected to the Internet 104 using wired links 108. The wired links 108 may, for example, be optical fiber links having transmission rate of Gigabit/s. The network 100 also includes an access point A2 which does not use the wired link 108 but rather connects to the Internet 104 via a wireless link to the access point A1. The wireless access links between the access points A0, A1, A2 and communication devices C0-C6 as well as the wireless link between the access points A1 and A2 use the high-frequency millimeter waves.

Figure 2:
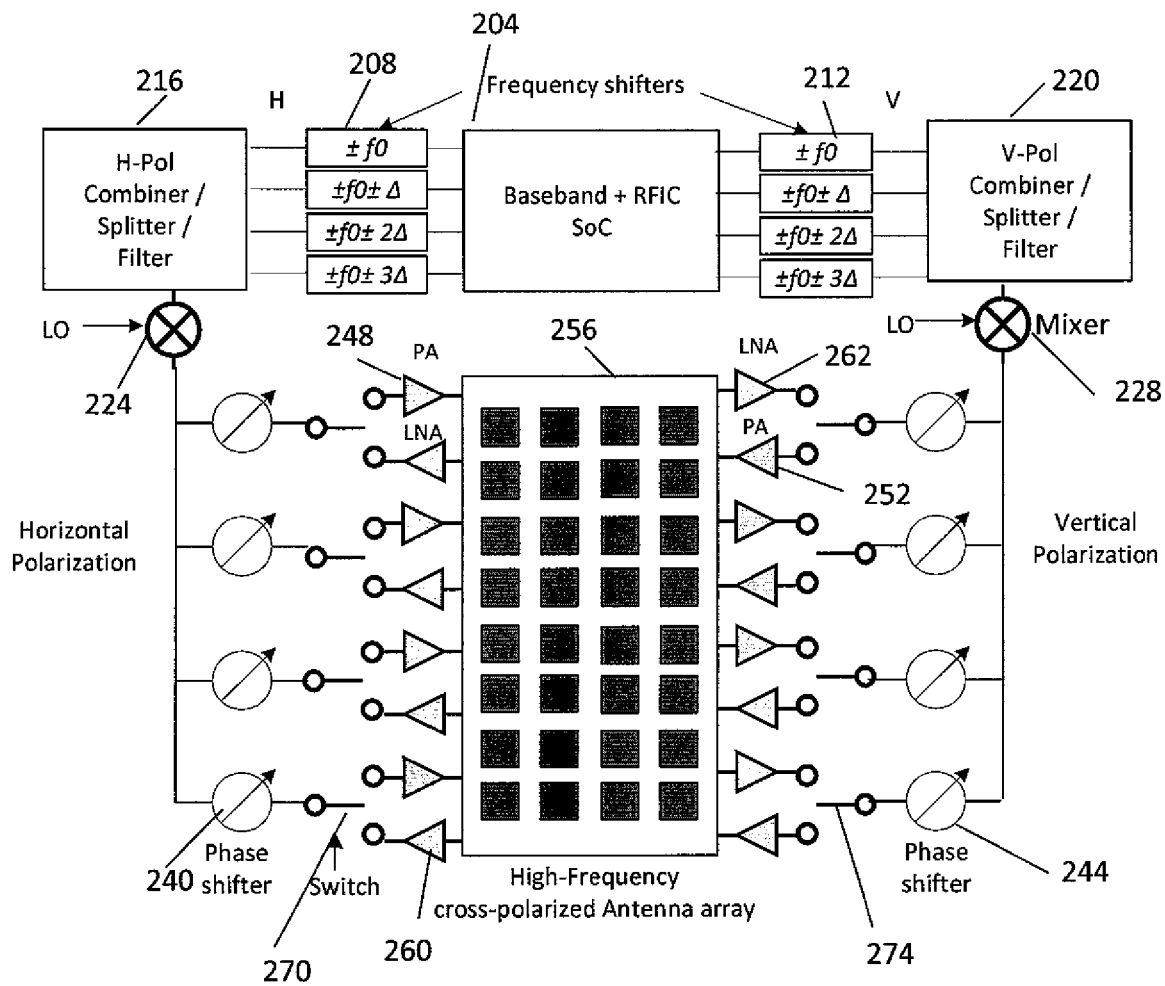
FIG. 2 illustrates a system for frequency scaling and bandwidth expansion in accordance with disclosed embodiments.

FIG. 2 illustrates a system 200 for frequency scaling and bandwidth expansion according to some disclosed embodiments. The system 200 can be implemented in the access points and the communication devices.

Referring to FIG. 2, a radio frequency integrated circuit (RFIC) system-on-a-chip (SoC) 204 generates intermediate frequency M multiple input multiple output (MIMO) spatial streams. The SoC refers to a circuit that includes baseband and RFIC functionalities. In other disclosed embodiments, the RFIC and baseband functionalities may be implemented in discrete circuits. The intermediate frequency spatial streams may, for example, be sub-6 GHz 4G LTE, Wi-Fi or 5G baseband signals.

According to some disclosed embodiments, the M spatial streams are divided into two groups with approximately similar number of spatial streams, the first group for transmission on horizontally polarized antennas and the second group for transmission on the vertically polarized antennas. Although, in the embodiment illustrated in FIG. 2, the total number of spatial streams is eight, in other embodiments the total number of spatial streams may, for example, be 2, 4, 6, 10, 12, 16 or any other integer number.

According to some disclosed embodiments, a frequency shift of $f_0$ is applied to the first spatial stream in each group, a frequency shift of $f_0+\Delta$ is applied to the second spatial stream in each group, a frequency shift of $f_0+2\Delta$ is applied to the third spatial stream in each group and finally a frequency shift of $f_0+3\Delta$ is applied to the fourth spatial stream in each group. Optionally, $f_0$ can be set to zero. The frequency shifts may be applied by frequency shift circuits 208 and 212 or the frequency shifts may be applied by local oscillators. The frequency shifted signals are combined by combiners/splitters 216 and 220 separately for horizontal and vertical polarization signal paths.

Each of the horizontal and vertical path signals are up-converted by mixers 224 and 228 driven by local oscillators (LO). In some disclosed embodiments, the frequency shifts discussed before may be applied by the local oscillators instead. The up-converted signals can optionally be split into multiple paths and appropriate phased shifting can be applied by phase shifters 240 and 244 for analog beamforming. The phase-shifted signals on the horizontal and vertical polarization paths are amplified by power amplifiers 248 and 252 and transmitted on horizontally and vertically polarized antennas 256.

According to disclosed embodiments, antenna 256 is an antenna array comprising a plurality of horizontally and vertically polarized antennas configured to transmit and receive at millimeter wave frequency bands.

According to disclosed embodiments, higher millimeter wave signals are received on the vertically and horizontally polarized antennas 256, and the received signals are amplified by the low noise amplifiers (LNA) 260 and 262. The system 200 includes switches 270 and 274 that selectively route the received signals to the low noise amplifiers 260 and 262 and route the transmit signals to the power amplifiers 248 and 252.

Phase shifting may be applied to the amplified signals and the resulting signals are combined coherently on each of the horizontal and vertical polarization paths to provide the analog beamforming gain. The signals on the horizontal and vertical polarization paths are down-converted to lower frequency by the mixers 224 and 228. The down-converted signals are filtered and split into two sets of four signals for the horizontal and vertical polarization.

The first received signal stream is frequency shifted down by $-f_0$ in each group, the second signal stream is frequency shifted down by $-f_0-\Delta$ in each group, the third signal stream is frequency shifted down by $-f_0-2\Delta$ in each group and finally the fourth signal stream is frequency shifted by $-f_0-3\Delta$ in each group. Optionally, $f_0$ can be set to zero. Furthermore, one may select $\Delta=-\Omega$. The resulting signals from frequency translation are centered at the same frequency and are fed into the eight spatial streams inputs of the SoC 204. The frequency translation can be performed either using real or quadrature mixers. In case of real mixers, signal spectrum at image frequency is created which is suppressed using bandpass filters. In the receive path, the image signal may not be eliminated as the filtering in the receiver can accommodate for this undesired signal and reject it.

Figure 3:
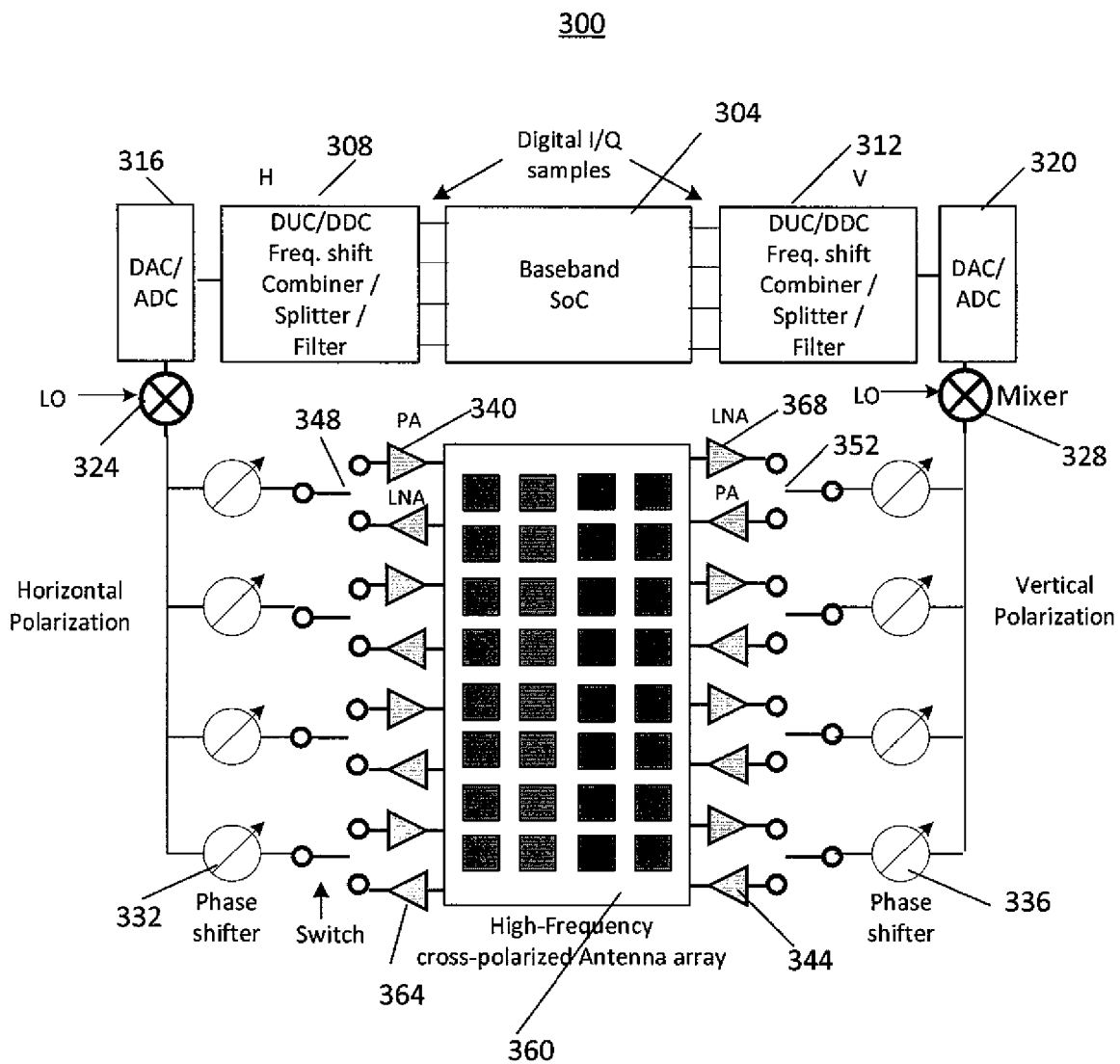
FIGS. 3-9 illustrate systems for frequency scaling and bandwidth expansion in accordance with other disclosed embodiments.

FIG. 3 illustrates a system 300 configured for signal bandwidth expansion in the digital-domain for carrying low-frequency MIMO signals at higher millimeter waves frequency signal bandwidth expansion. The system 300 includes a baseband/RFIC circuit 304 that generates M digital baseband In-Phase (I) and Quadrature (Q) spatial streams signals.

According to some disclosed embodiments, the M spatial streams are divided into two groups with approximately similar number of spatial streams, the first group for transmission on horizontally polarized antennas and the second group for transmission on the vertically polarized antennas. Although, in the embodiment illustrated in FIG. 3, the total number of spatial streams is eight, in other embodiments the total number of spatial streams may, for example, be 2, 4, 6, 10, 12, 16 or any other integer number.

Referring to FIG. 3, the spatial streams are up-sampled to a digital Intermediate Frequency (IF) signals at modules 308 and 312. According to disclosed embodiments, the modules 308 and 312 may be configured to perform multiple tasks including digital up-conversion and down conversion (DUC/DDC), frequency shifting, combining and splitting. The spatial streams are shifted in frequency digitally and combined at the modules 308 and 312. The combined digital IF signals are converted to analog domain by digital-to-analog/analog-to-digital (DAC/ADC) converters 316 and 320. The analog signals are further up-converted to higher millimeter waves by mixers 324 and 328. The mixers 324 and 328 are driven by respective local oscillators (LO).

The up-converted signals can optionally be split into multiple paths and appropriate phased shifting can be applied by phase shifters 332 and 336 for analog beamforming. The phase-shifted signals are routed to power amplifiers 340 and 344 by switches 348 and 352. The signals are amplified by the power amplifiers 340 and 344 and transmitted on high-frequency antenna array 360 which includes a plurality of horizontally polarized antennas and vertically polarized antennas. The first group of signals are transmitted on horizontally polarized antennas and the second group of signals are transmitted on vertically polarized antennas.

According to disclosed embodiments, higher millimeter wave signals received on the high-frequency antenna array 360 are amplified by the low noise amplifiers (LNA) 364 and 368 and are routed to the mixers 324 and 328 by switches 348 and 352. Phase shifting can be applied to the amplified signals and the resulting signals are combined coherently on each path to provide the analog beamforming gain. The resulting signals are down-converted to lower intermediate frequency (IF) by the mixers 324 and 328. The down-converted IF signals are converted to digital-domain by analog-to-digital (ADC) converters 316 and 320. The digital IF signals can be filtered, split and shifted in frequency creating a set of digital baseband In-Phase (I) and Quadrature (Q) signals by the modules 308 and 312 and the signals are processed by the baseband circuit 304.

Figure 4:
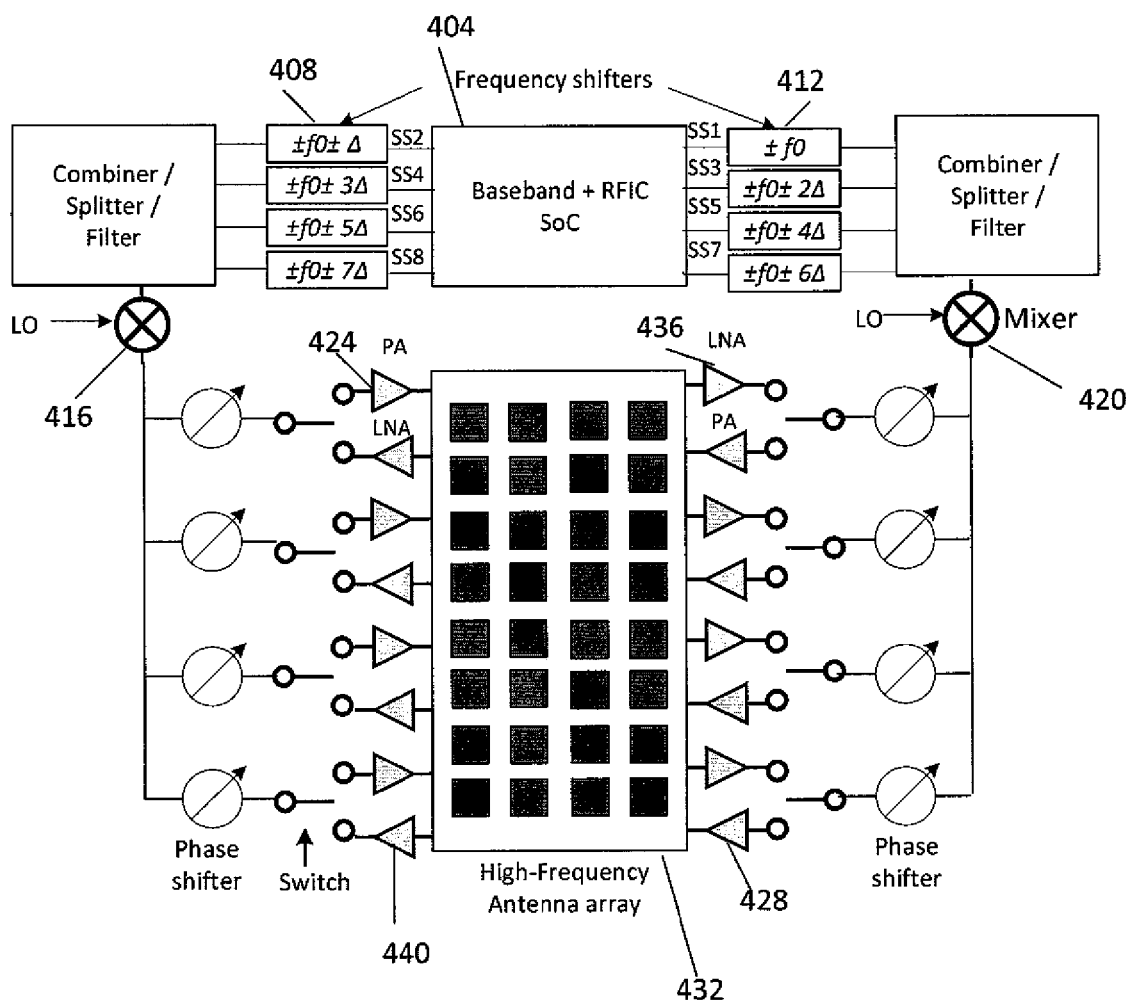

FIG. 4 illustrates a system 400 in accordance with another embodiment of the invention. The system 400 includes a baseband circuit 404 that generates eight spatial streams. A frequency shift of $[f_0+(k+1)\Delta]$ is applied to the kth spatial stream by frequency shift circuits 408 and 412. The frequency shifted signals are combined and up-converted to higher millimeter wave band signals by mixers 416 and 420. These up-converted signals can optionally be split into multiple paths and appropriate phased shifting can be applied for the analog beamforming. The phase-shifted signals are amplified by power amplifiers 424 and 428 and transmitted on high-frequency antenna array 432.

In the receive direction, higher millimeter wave signals received on the high-frequency antenna 432 array are amplified by low noise amplifiers (LNA) 436 and 440. Phase shifting can be applied to the amplified signals and the resulting signals are combined coherently on each to provide the analog beamforming gain. The resulting signals are down-converted to lower frequency by the mixers 416 and 420. The down-converted signals are filtered and split. The kth received signal is frequency shift by $[-f_0(k+1)\Delta]$ and the resulting signals from frequency translation are centered at the same frequency and are fed into the eight spatial streams inputs of the baseband circuit 404.

In the embodiment shown in FIG. 4, if the spatial stream signal bandwidth is 160 MHz and $\Delta=160$ MHz, the 160 MHz bandwidth is expanded by a factor of 8 resulting in total bandwidth of the signal transmitted at higher millimeter wave frequencies to 1.28 GHz. In the receive direction, the millimeter wave signals are down-converted and reverse frequency shifts are applied. The bandwidth seen by the circuit 404 will be 160 MHz but all the 8 spatial streams will operate at full capacity because they do not interfere with each other as they are carried on different parts of the higher frequency spectrum. Thus, the bandwidth expansion is transparent to the circuit 404.

In some embodiments of the current invention, the circuit 404 (e.g., system-on-a-chip (SoC)) may not include a radio frequency integrated circuit (RFIC) functions. However, other functions such as baseband, analog-to-digital converters (ADC) and digital-to-analog converters (DAC) may be included in the SoC 404.

Figure 5:
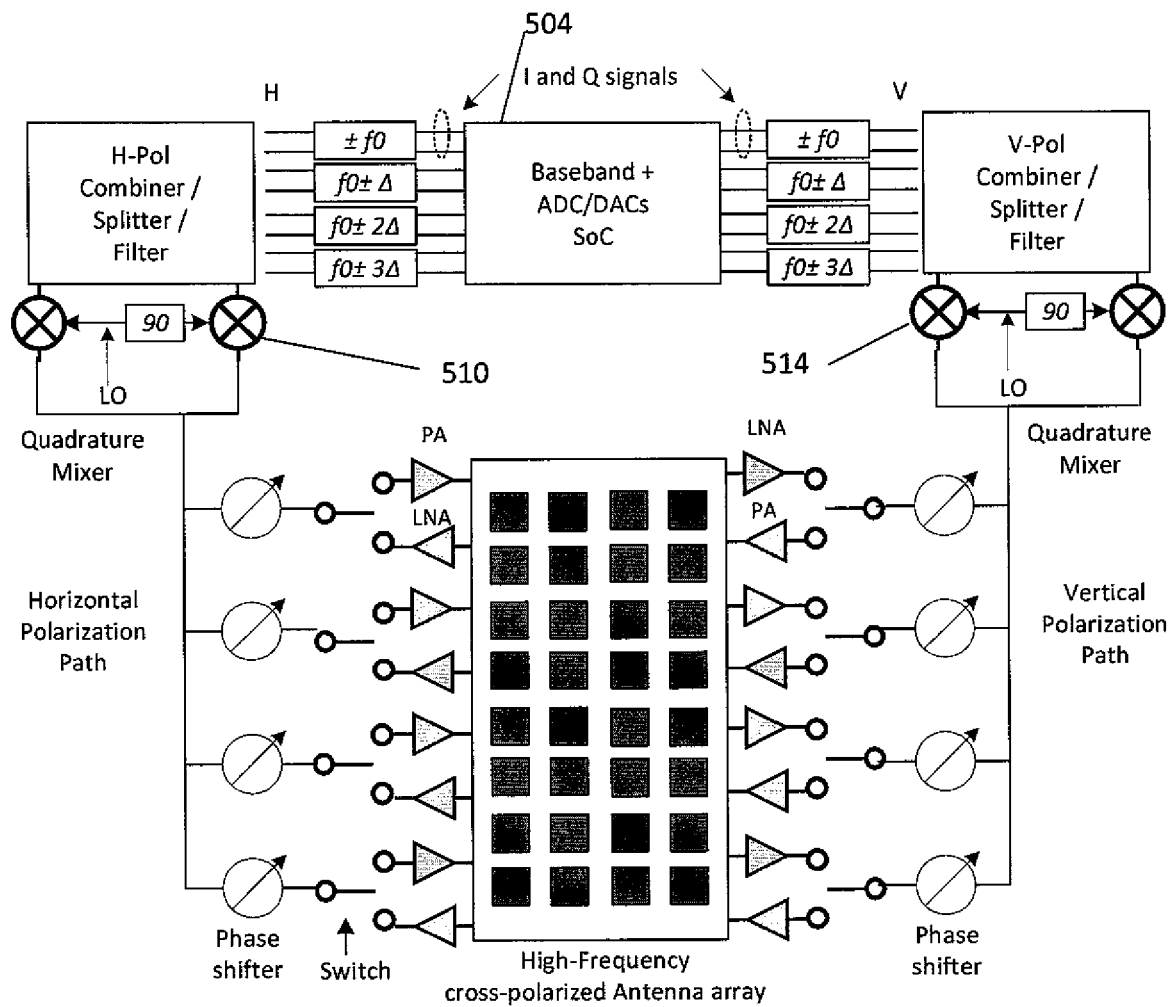

FIG. 5 illustrates another embodiment of the invention. As shown, analog baseband data from the circuit 504 (SoC) comprising In-Phase (I) and Quadrature components for each of the spatial streams are directly frequency-shifted and up-converted to a higher frequency without first converting to an intermediate lower frequency using direct-conversion principles. A frequency shift of $f_0$ is applied to the In-Phase (I) and Quadrature components of the first spatial stream in each group, a frequency shift of $f_0+\Delta$ is applied to In-Phase (I) and Quadrature components of the second spatial stream in each group, a frequency shift of $f_0+2\Delta$ is applied to the In-Phase (I) and Quadrature components of third spatial stream in each group and finally a frequency shift of $f_0+3\Delta$ is applied to the In-Phase (I) and Quadrature components of the fourth spatial stream in each group. Optionally, $f_0$ can be set to zero. The frequency shifted signals are combined separately for In-Phase (I) and Quadrature components as well as for horizontal and vertical polarization signal paths.

According to disclosed embodiments, each of the horizontal and vertical path signals are up-converted in two quadrature mixers 510 and 514. The up-converted signals can optionally be split into multiple paths and appropriate phased shifting can be applied to achieve analog beamforming. The phase-shifted signals on the horizontal and vertical polarization paths are amplified by the power amplifiers and transmitted on horizontally and vertically polarized antennas, respectively.

The higher millimeter wave signals received on the vertically and horizontally polarized antennas in the array are amplified by the low noise amplifiers (LNA). Optional phase shifting is applied to the amplified signals and the resulting signals are combined coherently on each of the horizontal and vertical polarization paths to provide the analog beamforming gain. The resulting signals on the horizontal and vertical polarization paths are down-converted to analog baseband signals by the two quadrature mixers 510 and 514. The down-converted signals are filtered and split into In-Phase (I) and Quadrature (Q) components for each of the eight spatial streams, which includes four spatial streams on horizontal polarization and four spatial streams on vertical polarization.

A frequency shift of $-f_0$ is applied to the In-Phase (I) and Quadrature (Q) components of the first spatial stream in each group, a frequency shift of $-f_0-\Delta$ is applied to the In-Phase (I) and Quadrature (Q) components of the second spatial stream in each group, a frequency shift of $-f_0-2\Delta$ is applied to the In-Phase (I) and Quadrature (Q) components of the third spatial stream in each group and finally a frequency shift of $-f_0-3\Delta$ is applied to the In-Phase (I) and Quadrature (Q) components of the fourth spatial stream in each group. Optionally, $f_0$ can be set to zero. The resulting analog baseband signals are then fed into the eight spatial streams inputs of the circuit 504 (SoC).

According to the disclosed embodiments, the frequency translation or shifts may be performed using one of several architectures. For example, the frequency translation may be performed using the weaver architecture which uses the mathematical equation $y(t)=A_m(t)\cos\{\omega_c t+\varphi_m(t)\}=A_m(t)\cos\{\omega_1 t+\omega_2 t+\varphi_m(t)\}$, where $\omega_1=2\pi f_{LFLO}$ and $\omega_c=\omega_1+\omega_2$. The equation may be expanded as $y(t)=A_m(t)\cos\{\omega_1 t+\varphi_m(t)\}\cos\omega_2 t - A_m(t)\sin\{\omega_1 t+\varphi_m(t)\}\sin\omega_2 t$, and can be implemented in the transmit direction as a first IQ mixer producing the terms $A_m(t)\cos\{\omega_1 t+\varphi_m(t)\}$ and $A_m(t)\sin\{\omega_1 t+\varphi_m(t)\}$ followed by an image suppression filter and then a second up-conversion by $\omega_2$. In the receive direction, the first stage down-converts by $\omega_2$ while the second stage down-converts by $\omega_1$.

In other embodiments, up-conversion may be performed to the center frequency $f_{LFLO}$ and the second up-conversion either using a real or a quadrature mixer. The undesired image created is rejected by a bandpass filter immediately following the mixer. Selection of $f_{LFLO}$ can relax the order of bandpass filter needed to perform adequate image suppression filtering. A low-pass or high-pass filter may be used as image reject filter based on the choice of $f_{LFLO}$. If the desired signal is on the higher side of $f_{LFLO}$, a highpass filter may be use instead of a bandpass filter. Conversely, if the desired signal is on the lower side of the $f_{LFLO}$, a low pass filter maybe used to reject the undesired image.

In the receive direction the first down-conversion is to the center frequency $f_{LFLO}$ which is followed by a second mixing stage to DC. Image suppression filter is optional because of the baseband filtering in the receiver.

Figure 6:
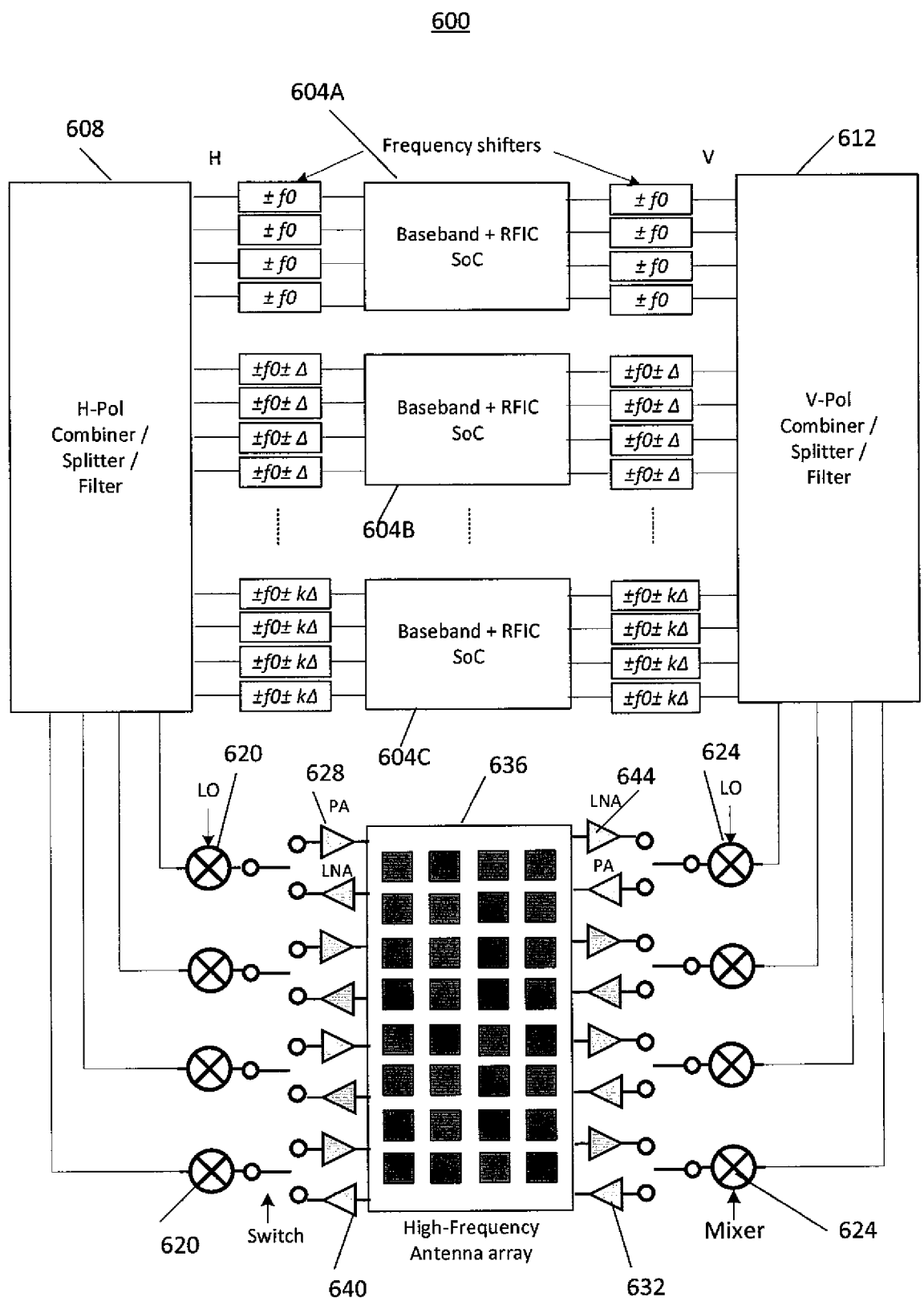

FIG. 6 illustrates a system 600 in accordance with another embodiment of the invention. The system 600 includes multiple low frequency baseband and radio frequency integrated circuit (RFIC) system-on-a-chips (SoCs) 604A-604N that share a same higher frequency radio front-end including, among others, mixers, power amplifiers, low-noise amplifiers, switches and antennas. The system 600 featuring multiple SoCs 604A-604N provides higher capacity, higher data rates and supports greater number of users in the network.

As shown in FIG. 6, each SoC supports transmission of eight (M=8) multiple input multiple output (MIMO) spatial streams (SS). The eight spatial streams are divided into two groups of four spatial streams each, first group for transmission on horizontally polarized antennas and the second group for transmission on the vertically polarized antennas. A frequency shift of $f_0$ is applied to all the eight spatial streams from the first SoC, a frequency shift of $(f_0+\Delta)$ is applied to all the eight spatial streams from the second SoC and so forth with a frequency shift of $(f_0+k\Delta)$ applied to all the eight spatial streams from the (k+1)th SoC. The frequency shifted signals are combined by combiners 608 and 612 for each spatial stream from each of the SoC separately resulting in four signals on the horizontal signal path and four signals on the vertical polarization signal path.

Each of the four signals on the horizontal signal path and four signals on the vertical polarization signal path are up-converted to higher millimeter waves using eight mixers 620 and 624 driven by a local oscillator (LO). The up-converted higher millimeter waves signals on the horizontal and vertical polarization paths are amplified by the power amplifiers 628 and 632 and transmitted on the horizontally and vertically polarized antennas shown as an antenna array 636 respectively. The antenna array 636 includes a plurality of horizontally and vertically polarized antennas.

In the receive path, the higher millimeter wave signals received on the vertically and horizontally polarized antennas in the antenna array are amplified by four low noise amplifiers (LNA) 640 on the horizontal polarization path and four LNAs 644 on the vertical polarization path. The amplified received signals on the horizontal and vertical polarization paths are down-converted to lower frequency four mixers driven by a local oscillator (LO) on the horizontal polarization path and four mixers driven by a local oscillator (LO) on the vertical polarization path.

The down-converted signals are filtered and split into 4(k+1) signals on the horizontal path and 4(k+1) signals on the vertical path with each SoC receiving four signals on the horizontal path and four signals on the vertical path. A frequency shift of $-f_0$ is applied to all the eight spatial streams going into the first SoC, a frequency shift of $(-f_0-\Delta)$ is applied to all the eight spatial streams going into the second SoC and so forth with a frequency shift of $(-f_0-k\Delta)$ applied to all the eight spatial streams going into the (k+1)th SoC. The resulting signals at the input of all SoCs are centered at the same low frequency.

In the implementation of FIG. 6, transmission and reception at the low frequency baseband and radio frequency integrated circuit (RFIC) system-on-a-chips 604A-604N need to be synchronized as they share the mixers, switches and antennas between the transmit and receive modes. In other words, all the SoCs needs to be either in transmit or receive mode at the same time.

Figure 7:
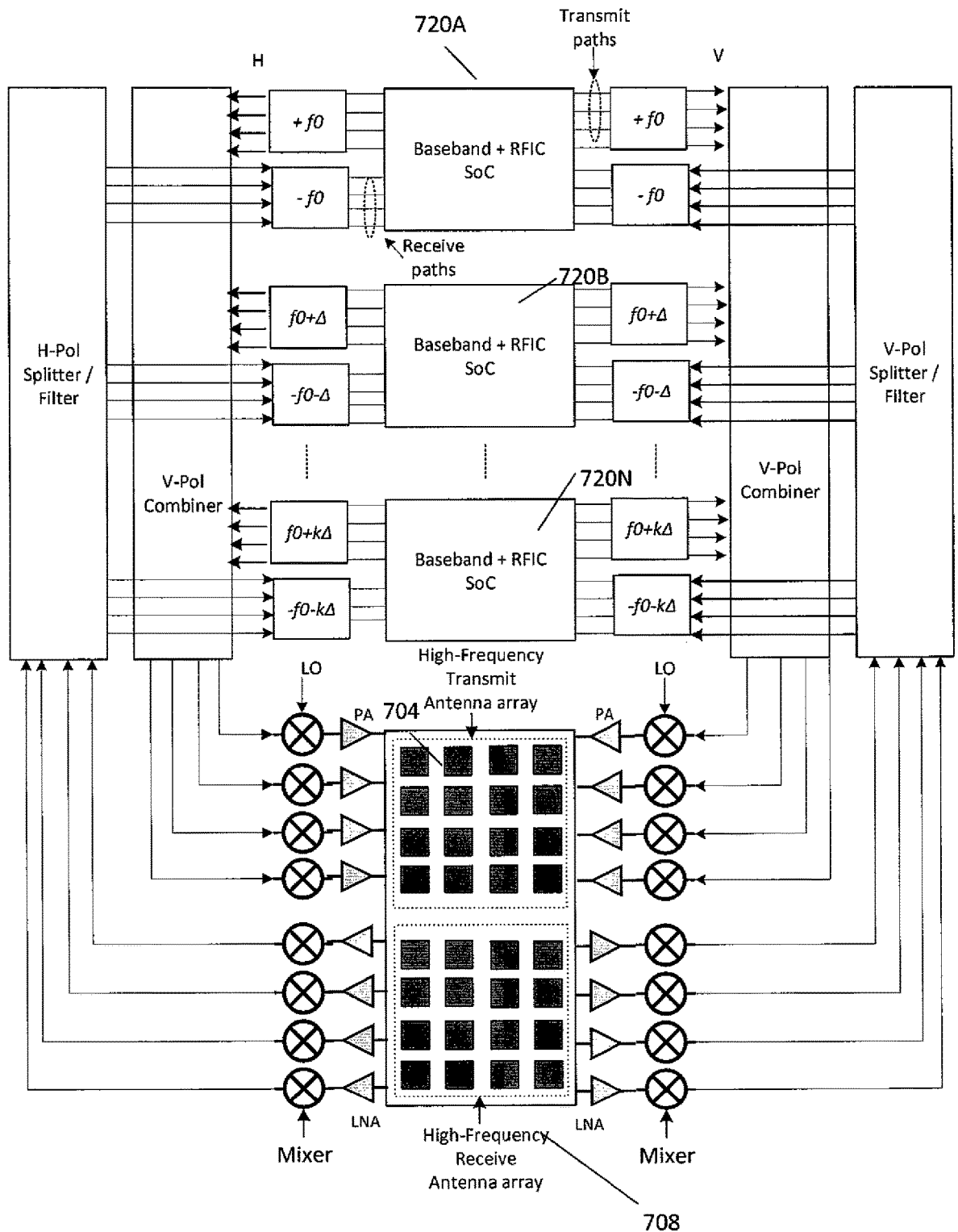

FIG. 7 illustrates a system 700 in accordance with another embodiment of the invention. The system 700 uses separate transmit and receive chains as well as separate transmit and receive antenna arrays 704 and 708 to alleviate the need for transmit and receive modes synchronization across multiple SoCs 720A-720N. The antenna arrays 704 and 708 each include a plurality of horizontally and vertically polarized antennas.

Referring to FIG. 7, each SoC supports transmission of eight (M=8) multiple input multiple output (MIMO) spatial streams (SS). The spatial streams signals coming out of all the SoCs 720A-720N are centered at the lower frequency below 6 GHz. With the use of separate transmit and receive chains, an input and an output per SoC are provided for each of the eight spatial streams. Thus, eight transmit signals are coming out of an SoC and eight receive signals are going into an SoC.

For each of the SoC, the eight spatial streams transmit signals are divided into two groups of four transmit signal paths each, first group for transmission on the horizontally polarized antennas and the second group for transmission on the vertically polarized antennas. A frequency shift of $f_0$ is applied to all the eight spatial streams transmit signals from the first SoC, a frequency shift of $(f_0+\Delta)$ is applied to all the eight spatial streams transmit signals from the second SoC and so forth with a frequency shift of $(f_0+k\Delta)$ applied to all the eight spatial streams transmit signals from the (k+1)th SoC. The frequency shifted signals are combined for each spatial stream from each of the SoC separately resulting in four signals on the horizontal signal path and four signals on the vertical polarization signal path.

Each of the four signals on the horizontal signal path and four signals on the vertical polarization signal path are up-converted to higher millimeter waves using eight mixers driven by a local oscillator (LO). The up-converted higher millimeter waves signals on the horizontal and vertical polarization paths are amplified by the power amplifiers and transmitted on the horizontally and vertically polarized transmit antennas 704, respectively.

In the reverse path, the higher millimeter wave signals received on the vertically and horizontally polarized receive antennas 708 in the receive antenna array are amplified by four low noise amplifiers (LNA) on the horizontal polarization path and four LNAs on the vertical polarization path. The amplified received signals on the horizontal and vertical polarization paths are down-converted to lower frequency four mixers driven by a local oscillator (LO) on the horizontal polarization path and four mixers driven by a local oscillator (LO) on the vertical polarization path.

The down-converted signals are filtered and split into 4(k+1) signals on the horizontal path and 4(k+1) signals on the vertical path with each SoC receiving four signals on the horizontal path and four signals on the vertical path. A frequency shift of $-f_0$ is applied to all the eight spatial streams receive signals going into the first SoC, a frequency shift of $(-f_0-\Delta)$ is applied to all the eight spatial streams receive signals going into the second SoC and so forth with a frequency shift of $(-f_0-k\Delta)$ applied to all the eight spatial streams receive signals going into the (k+1)th SoC. The resulting receive signals at the input of all SoCs are centered at the same low frequency.

In the exemplary embodiment illustrated in FIG. 7, the transmit and receive chains are independent of each other. Thus, transmit and receive modes of the SoCs 720A-720N do not need to be synchronized. At a given time, some SoCs can be in the transmit mode and yet some other SoCs in the receive mode without interfering with each other. With unique frequency shift applied to signals from each SoC, signals are transmitted and received on a different frequency for each of the SoCs. For example, at time instant t, the SoC 720A may be transmitting signals with a frequency shift of $f_0$ applied to its signals while the SoC 720B receiving its signals at the same time instant t, with a frequency shift of $(-f_0-\Delta)$ applied to it signals. The center frequencies of the millimeter wave over-the-air transmissions for these two SoCs 720A and 720B will be separated by $\Delta$Hz and will not interfere with each other.

In another disclosed embodiment of the invention, transmit and receive modes use different millimeter wave center frequencies. For the SoCs in the transmit mode, low frequency signals are frequency-shifted, combined and the resulting four signals on the horizontal signal path and four signals on the vertical polarization signal path are up-converted to higher millimeter waves using eight mixers driven by a first local oscillator (LO1).

For the SoCs in the receive mode, the received higher millimeter waves signals on the horizontal polarization signal path and signals on the vertical polarization signal path are down-converted to lower frequency signals by using eight mixers driven by a second local oscillator (LO2). The up/down-conversion using different oscillators will generate different higher millimeter wave center frequencies. By proper choice of the frequencies of these local oscillators, a desired frequency separation can be created to avoid interference between the higher millimeter wave signals transmitted and received over-the-air.

By way of example, a first local oscillator (LO1) frequency can be chosen to center the high frequency over-the-air transmissions at 39 GHz while a second local oscillator (LO2) frequency can be chosen to center the high frequency over-the-air receptions at 28 GHz LMDS band. In another scenario, the first local oscillator (LO1) frequency can be chosen to center the high frequency over-the-air transmissions at 60 GHz while the second local oscillator (LO2) frequency can be chosen to center the high frequency over-the-air receptions at 39 GHz LMDS band. In general, high frequency over-the-air transmissions and receptions can be centered at any of the bands shown in Table 1.

The above method may advantageously be embodied in the wireless network shown in FIG. 1. For example, when the access points A0 transmits on 39 GHz band by proper choice of its transmit oscillator (LO1) frequency, the communication devices C0-C3 in its coverage receive these high-frequency transmissions by proper choice of the receive oscillator (LO2) frequency. Thus, the transmit oscillator (LO1) frequency of the access point A0 needs to be the same as the receive oscillator (LO2) frequency in the communication devices.

In the reverse direction, the transmit oscillator (LO1) frequency in the communication devices needs to be the same as the receive oscillator (LO2) frequency in the access point A0. Different access points in the network may chose different bands shown in Table 1. When access point A0 and access point A2 communicate over a wireless network, their transmit and receive bands also needs to be aligned the same way as for communication between the access points and the communications devices.

Figure 8:
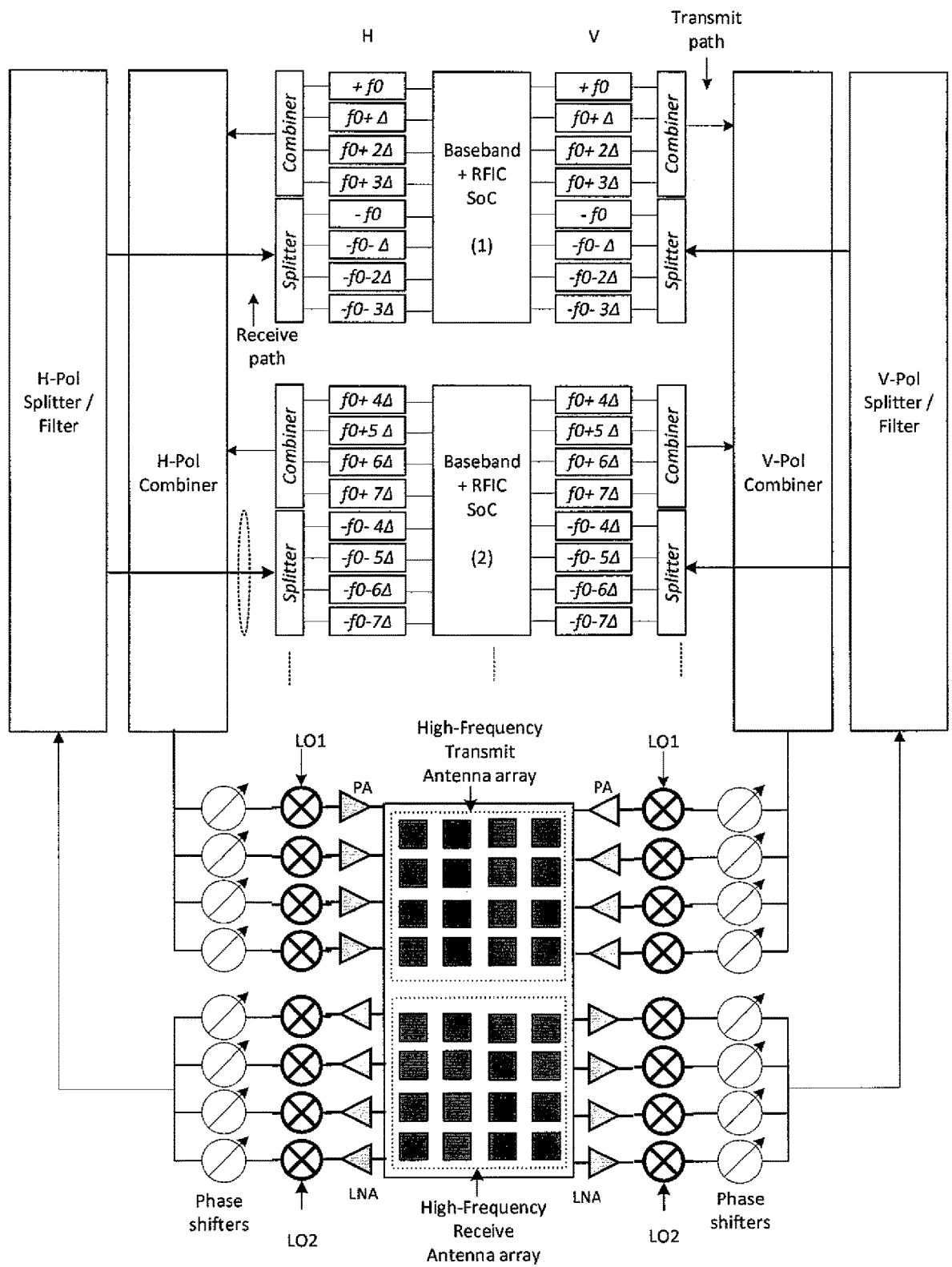

FIG. 8 illustrates another disclosed embodiment including multiple system-on-chips (SoC). The transmit and receive modes use different center frequencies. The spatial streams are divided into two groups, first group for transmission on horizontally polarized antennas and the second group for transmission on the vertically polarized antennas.

For the low-frequency signals of the first SoC, a frequency shift of $f_0$ is applied to the first spatial stream in each group, a frequency shift of $f_0+\Delta$ is applied to the second spatial stream in each group, a frequency shift of $f_0+2\Delta$ is applied to the third spatial stream in each group and finally a frequency shift of $f_0+3\Delta$ is applied to the fourth spatial stream in each group.

For the low-frequency signals of the second SoC, a frequency shift of $f_0+4\Delta$ is applied to the first spatial stream in each group, a frequency shift of $f_0+5\Delta$ is applied to the second spatial stream in each group, a frequency shift of $f_0+6\Delta$ is applied to the third spatial stream in each group and finally a frequency shift of $f_0+7\Delta$ is applied to the fourth spatial stream in each group.

This pattern of frequency-shifts continues for the remaining SoCs in the system. Thus, a unique frequency shift is applied to each pair of horizontal and vertical spatial streams (SS). The frequency shifted signals of multiple spatial streams (SS) and multiple SoCs are combined on each of the horizontal and vertical path signals. These horizontal and vertical path signals are up-converted in the two mixers. The up-converted signals can optionally be split into multiple paths and appropriate phased shifting can be applied for the analog beamforming. The phase-shifted signals on the horizontal and vertical polarization paths are amplified by the power amplifiers and transmitted on the horizontally and vertically polarized antennas respectively.

The higher millimeter wave signals received on the vertically and horizontally polarized antennas in the array are amplified by the low noise amplifiers (LNA). Phase shifting can be applied to the amplified signals and the resulting signals are combined coherently on each of the horizontal and vertical polarization paths to provide the analog beamforming gain. The resulting signals on the horizontal and vertical polarization paths are down-converted to lower frequency by the mixers. The down-converted signals are filtered and split for each of the SoCs and each of the spatial stream (SS).

For the first SoC, the first received signal stream is frequency shifted by $-f_0$ in each group, the second signal stream is frequency shifted by $-f_0-\Delta$ in each group, the third signal stream is frequency shifted by $-f_0-2\Delta$ in each group and finally the fourth signal stream is frequency shifted by $-f_0-3\Delta$ in each group. The resulting signals from translation are centered at the same frequency and are fed into the eight spatial streams inputs of the first SoC.

For the second SoC, the first received signal stream is frequency shifted by $-f_0-4\Delta$ in each group, the second signal stream is frequency shifted by $-f_0-5\Delta$ in each group, the third signal stream is frequency shifted by $-f_0-6\Delta$ in each group and finally the fourth signal stream is frequency shifted by $-f_0-7\Delta$ in each group. The resulting signals from translation are centered at the same frequency and are fed into the eight spatial streams inputs of the second SoC. This pattern of frequency-shifts continues for the remaining SoCs with a unique frequency shift applied to each pair of horizontal and vertical spatial streams (SS).

The frequency translation can be performed either using real or quadrature mixers. In case of real mixers, signal spectrum at image frequency is created which is suppressed using bandpass filters. In the receive path, the image signal may not be eliminated as the filtering in the receiver can accommodate for this undesired signal and reject it.

Figure 9:
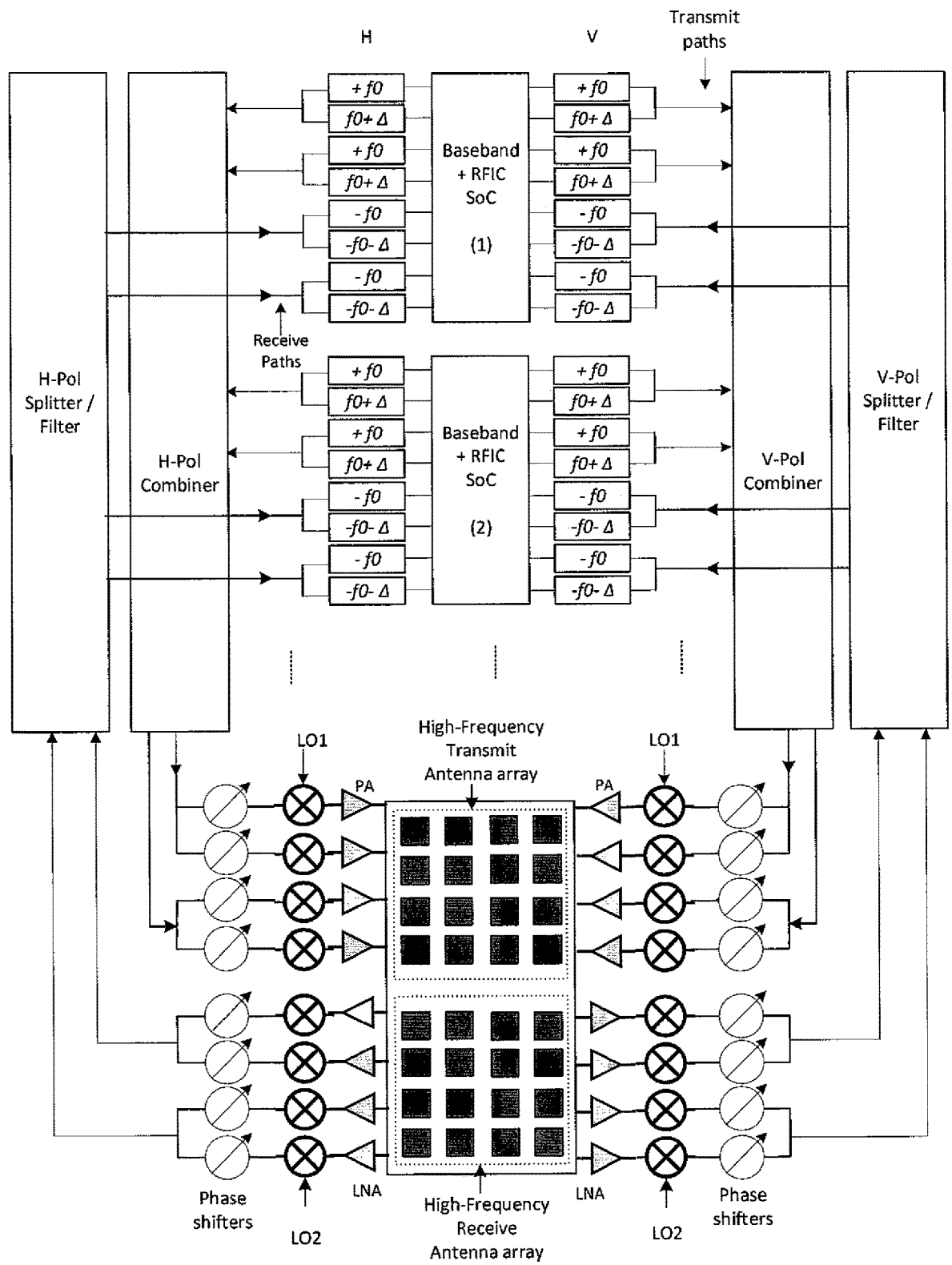

FIG. 9 illustrates another embodiment wherein same frequency shift is applied to four spatial stream (SS), two on the horizontal polarization and two on the vertical polarization. Thus, for the case of an SoC with M spatial streams, M/4 frequency shift values are applied for each SoC. In the embodiment illustrated in FIG. 9, since M=8 spatial streams per SoC, two frequency shift values are applied to each SoC.

In the exemplary embodiments discussed above, it has generally been assumed that the transmit and the receive antenna arrays use horizontally and vertically polarized antennas. However, the principles of the present disclosure also apply to antenna arrays that use the same polarization such as linear, elliptical or circular polarization.

Also, in the exemplary embodiments discussed above, exemplary frequency translations of $f_0+k\Delta$ for (k=0,1,2, . . . (N−1)) for up-conversion and $-f_0-k\Delta$ for down-conversion are used, where k represents the group number of a spatial stream. The translation of group k is not necessitated to be by $\pm k\Delta$ but it can be any translation from the set $\gamma=\{0,\pm\Delta, \pm2\Delta, \ldots, \pm k\Delta\}$. Hence, k groups of signals to be combined can be mapped to one permutation of the shifts in the set $\gamma$. The mapping may be changed during the operation of the devices such that the best performance of the communication links are achieved by the mapping that produces highest signal to noise ratio (SNR) for the signal of interest or the highest achievable throughput as determined by estimating appropriate metrics in the SoC.

Also, in the exemplary embodiments discussed above, baseband functions are implemented in an application-specific integrated circuit (ASIC) system-on-a-chip (SoC). In other embodiments, baseband functions can be implemented on general-purpose processors or in field programmable field-programmable gate array (FPGA) integrated circuits.

Also, in the exemplary embodiments discussed above, low frequency signals out of the SoC and into the SoC are centered at the same low frequency. In other embodiments, the low frequency signals out of the SoC and into the SoC may not be centered at the same low frequency.

Also, in the exemplary embodiments discussed above, all the SoCs in a system support the same number of spatial streams (SS). In other embodiments, the number of spatial streams per SoC can be different and the principles of the current invention still apply.

Also, in the other embodiments, the frequency shifting, signal combining, signal splitting, up-conversion, down-conversion and phase-shifting function can be implemented in another Radio Frequency Integrated Circuit (RFIC).

Those skilled in the art will recognize that, for simplicity and clarity, the full structure and operation of all systems suitable for use with the present disclosure is not being depicted or described herein. Instead, only so much of a system as is unique to the present disclosure or necessary for an understanding of the present disclosure is depicted and described. The remainder of the construction and operation of the disclosed systems may conform to any of the various current implementations and practices known in the art.

Of course, those of skill in the art will recognize that, unless specifically indicated or required by the sequence of operations, certain steps in the processes described above may be omitted, performed concurrently or sequentially, or performed in a different order. Further, no component, element, or process should be considered essential to any specific claimed embodiment, and each of the components, elements, or processes can be combined in still other embodiments.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

The invention claimed is:

1. A wireless transmitter, comprising:
   a signal processing circuit configured to generate a plurality of first and second spatial streams signals;
   a frequency shift circuit configured to selectively apply different frequency shifts to the first and second spatial streams signals, wherein a first frequency shift is applied to the first spatial stream signal and a second frequency shift is applied to the second spatial stream signal, and wherein the first frequency shift is different than the second frequency shift, wherein the frequency shift circuit does not apply phase shifts to the first spatial stream signal and to the second spatial stream signal;
   a mixer configured to up-convert the frequency shifted first and second spatial streams signals to first and second millimeter wave frequency band signals;
   a horizontally polarized multiple input multiple output (MIMO) antenna array configured to transmit the first millimeter wave frequency band signals; and
   a vertically polarized multiple input multiple output (MIMO) antenna array configured to transmit the second millimeter wave frequency band signals.

2. The wireless transmitter of claim 1, further comprising a plurality of power amplifiers configured to amplify the first and second millimeter wave frequency band signals prior to transmission by the horizontally and vertically polarized MIMO antenna array.

3. The wireless transmitter of claim 1, further comprising a plurality of power amplifiers configured to amplify the first and second millimeter wave frequency band signals prior to transmission by the horizontally and vertically polarized MIMO antenna array.

4. The wireless transmitter of claim 1, wherein the millimeter wave frequency bands are greater than 20 GHz.

5. The wireless transmitter of claim 1, wherein the first and second spatial streams signals are sub-6 GHz signals.

6. The wireless transmitter of claim 1, further comprising a signal combiner configured to combine the frequency shifted signals prior to up-conversion.

7. A wireless transmitter, comprising:
a signal processing circuit configured to generate a plurality of first and second spatial streams signals;
a mixer driven by a local oscillator configured to selectively apply different frequency shifts to the first and second spatial streams signals and to up-convert the frequency shifted first and second spatial streams signals to first and second millimeter wave frequency band signals, wherein a first frequency shift is applied to the first spatial stream signal and a second frequency shift is applied to the second spatial stream signal, and wherein the first frequency shift is different than the second frequency shift, wherein the frequency shift circuit does not apply phase shifts to the first spatial stream signal and to the second spatial stream signal;
a plurality of power amplifiers configured to amplify the first and second millimeter wave frequency band signals;
a horizontally polarized multiple input multiple output (MIMO) antenna array configured to transmit the first millimeter wave frequency band signals; and
a vertically polarized multiple input multiple output (MIMO) antenna array configured to transmit the second millimeter wave frequency band signals.

8. The wireless transmitter of claim 7, further comprising a plurality of phase shifters configured to apply phase shifts to the up-converted millimeter wave frequency band signals.

9. The wireless transmitter of claim 7, wherein the first and second spatial streams signals are greater than 20 GHz.

10. The wireless transmitter of claim 7, wherein the first and second spatial streams signals are sub-6 GHz signals.

11. The wireless transmitter of claim 7, further comprising a signal combiner configured to combine the frequency shifted signals prior to up-conversion.

12. A wireless transmitter, comprising:
a signal processing circuit configured to generate a plurality of spatial streams signals;
a frequency shift circuit configured to selectively apply different frequency shifts to the spatial streams signals, wherein a first frequency shift is applied to a first spatial stream signal and a second frequency shift is applied to a second spatial stream signal, and wherein the first frequency shift is different than the second frequency shift, wherein the frequency shift circuit does not apply phase shifts to the first spatial stream signal and to the second spatial stream signal;
a mixer configured to up-convert the frequency shifted spatial streams signals to first and second millimeter wave frequency band signals;
a multiple input multiple output (MIMO) antenna array configured to transmit the millimeter wave frequency band signals.

13. A wireless receiver, comprising:
a horizontally polarized multiple input multiple output (MIMO) antenna array configured to receive first millimeter wave frequency band signals;
a vertically polarized multiple input multiple output (MIMO) antenna array configured to receive second millimeter wave frequency band signals;
a mixer configured to down-convert the first and second millimeter wave frequency band signals;
a frequency shift circuit configured to selectively apply different frequency shifts to the first and second down-converted signals, wherein a first frequency shift is applied to the first down-converted signals and a second frequency shift is applied to the second down-converted signals, and wherein the first frequency shift is different than the second frequency shift, wherein the frequency shift circuit does not apply phase shifts to the first spatial stream signal and to the second spatial stream signal;
a signal processing circuit configured to process the first and second frequency shifted signals.

14. The wireless receiver of claim 13, wherein the first frequency band signals are horizontally polarized.

15. The wireless receiver of claim 13, wherein the second millimeter wave frequency band signals are vertically polarized.

16. The wireless receiver of claim 13, further comprising a plurality of low noise amplifiers coupled to the MIMO antenna array, the low noise amplifiers configured to amplify the first and second millimeter wave frequency band signals.

17. A wireless receiver, comprising:
a horizontally polarized multiple input multiple output (MIMO) antenna array configured to receive first millimeter wave frequency band signals;
a vertically polarized multiple input multiple output (MIMO) antenna array configured to receive second millimeter wave frequency band signals;
a mixer driven by a local oscillator configured to down-convert the first and second millimeter wave frequency band signals and to selectively apply frequency shifts to the first and second down-converted signals, wherein a first frequency shift is applied to the first down-converted signals and a second frequency shift is applied to the second down-converted signals, and wherein the first frequency shift is different than the second frequency shift, wherein the frequency shift circuit does not apply phase shifts to the first spatial stream signal and to the second spatial stream signal;
a signal processing circuit configured to process the first and second frequency shifted signals.

18. The wireless receiver of claim 17, wherein the millimeter wave frequency bands are greater than 20 GHz.

19. The wireless receiver of claim 17, wherein the first and second millimeter wave band signals are down-converted to sub-6 GHz signals.

20. The wireless receiver of claim 17, further comprising a signal combiner configured to combine the down-converted signals.

21. A method for wireless communication, comprising:
generating a plurality of first and second transmit signals at a user equipment (UE);
selectively applying different frequency shifts to the first and second transmit signals, wherein a first frequency shift is applied to the first transmit signals and a second frequency shift is applied to the second transmit signals, and wherein the first frequency shift is different than the second frequency shift, wherein the different frequency shifts are selectively applied without applying phase shifts to the first spatial stream signal and to the second spatial stream signal;

up-converting the frequency shifted first and second transmit signals to first and second millimeter wave frequency band signals;

transmitting the first and second millimeter wave frequency band signals using MIMO antenna arrays.

22. The method of claim 21, further comprising applying phase shifts to the first and second millimeter wave frequency band signals.

23. The method of claim 21, wherein the first and second transmit signals are processed by different radio frequency (RF) chains.

24. The method of claim 21, wherein the UE is a customer premise equipment (CPE).

25. The method of claim 21, wherein the UE is a mobile communication device.

26. A method for wireless communication, comprising:
receiving first and second millimeter wave band signals at a user equipment (UE);

down-converting the first and second millimeter wave band signals to first and second intermediate frequency band signals;

selectively applying different frequency shifts to the first and second intermediate frequency band signals, wherein a first frequency shift is applied to the first intermediate frequency band signals and a second frequency shift is applied to the second intermediate frequency band signals, and wherein the first frequency shift is different than the second frequency shift, wherein the different frequency shifts are selectively applied without applying phase shifts to the first spatial stream signal and to the second spatial stream signal.

27. The method of claim 26, further comprising applying phase shifts to the first and second millimeter wave frequency band signals.

28. The method of claim 26, wherein the first and second millimeter wave frequency band signals are processed by different radio frequency (RF) chains.

29. The method of claim 26, wherein the UE is a customer premise equipment (CPE).

30. The method of claim 26, wherein the UE is a mobile communication device.

31. A method for wireless communication, comprising:
generating a plurality of first and second transmit signals at a radio base station;

selectively applying different frequency shifts to the first and second transmit signals wherein a first frequency shift is applied to the first transmit signals and a second frequency shift is applied to the second transmit signals, and wherein the first frequency shift is different than the second frequency shift, wherein the different frequency shifts are selectively applied without applying phase shifts to the first spatial stream signal and to the second spatial stream signal;

up-converting the frequency shifted first and second transmit signals to first and second millimeter wave frequency band signals;

transmitting the first and second millimeter wave frequency band signals using MIMO antenna arrays.

32. A method for wireless communication, comprising:
receiving first and second millimeter wave band signals at a radio base station;

down-converting the first and second millimeter wave band signals to first and second intermediate frequency band signals;

selectively applying different frequency shifts to the first and second intermediate frequency band signals, wherein a first frequency shift is applied to the first intermediate frequency band signals and a second frequency shift is applied to the second intermediate frequency band signals, and wherein the first frequency shift is different than the second frequency shift, wherein the different frequency shifts are selectively applied without applying phase shifts to the first spatial stream signal and to the second spatial stream signal;

processing the frequency shifted first and second intermediate frequency band signals.

\* \* \* \* \*